US010516695B1

(12) United States Patent
Evans

(10) Patent No.: US 10,516,695 B1
(45) Date of Patent: Dec. 24, 2019

(54) DISTRIBUTED DENIAL OF SERVICE ATTACK MITIGATION IN SERVICE PROVIDER SYSTEMS

(71) Applicant: Amazon Technologies, Inc., Seattle, WA (US)

(72) Inventor: Sean R. Evans, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 15/716,080

(22) Filed: Sep. 26, 2017

(51) Int. Cl.
*H04L 29/06* (2006.01)
(52) U.S. Cl.
CPC ...... *H04L 63/1458* (2013.01); *H04L 63/1425* (2013.01)
(58) Field of Classification Search
CPC . H04L 63/14; H04L 63/1408; H04L 63/1416; H04L 63/1425
See application file for complete search history.

(56) References Cited

U.S. PATENT DOCUMENTS

| 7,970,886 | B1 * | 6/2011 | Wetherall | H04L 41/28 709/224 |
| 2002/0032854 | A1 * | 3/2002 | Chen | H04L 63/1408 713/151 |
| 2002/0035683 | A1 * | 3/2002 | Kaashoek | H04L 43/00 713/154 |
| 2003/0145232 | A1 * | 7/2003 | Poletto | H04L 63/1408 726/22 |
| 2003/0204621 | A1 * | 10/2003 | Poletto | H04L 45/00 709/239 |
| 2005/0018618 | A1 * | 1/2005 | Mualem | H04L 63/1458 370/252 |
| 2005/0213570 | A1 * | 9/2005 | Stacy | H04L 47/32 370/389 |
| 2006/0010389 | A1 * | 1/2006 | Rooney | H04L 63/1425 715/736 |
| 2010/0122342 | A1 * | 5/2010 | El-Moussa | H04L 63/1425 726/22 |
| 2013/0133068 | A1 * | 5/2013 | Jiang | G06F 9/45533 726/23 |
| 2015/0040228 | A1 * | 2/2015 | Lee | H04L 63/1433 726/25 |
| 2015/0149611 | A1 * | 5/2015 | Lissack | H04L 43/0817 709/224 |
| 2015/0149631 | A1 * | 5/2015 | Lissack | H04L 41/5051 709/226 |
| 2016/0255103 | A1 * | 9/2016 | Yao | G06F 9/45558 726/23 |

* cited by examiner

*Primary Examiner* — Ponnoreay Pich
(74) *Attorney, Agent, or Firm* — Nicholson De Vos Webster & Elliott, LLP

(57) ABSTRACT

Techniques for detecting and mitigating distributed denial of service (DDoS) attacks sourced from within a service provider system are described. A service obtains traffic data comprising a plurality of entries that describe outbound network traffic originated by a plurality of compute instances within the service provider system that is destined to locations outside the service provider system. The service determines that one or more destination network addresses identified within the traffic data are likely targets of a DDoS attack, determines a responsive action from a plurality of candidate responsive actions to perform with regard to the one or more compute instances, and causes the responsive action to be performed in the service provider system.

20 Claims, 9 Drawing Sheets

US 10,516,695 B1

DISTRIBUTED DENIAL OF SERVICE ATTACK MITIGATION IN SERVICE PROVIDER SYSTEMS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to provide those services is dynamically scalable to meet the needs of the services at any given time. A user or customer often will rent, lease, or otherwise pay for access to resources provided in a service provider's system, and thus does not have to purchase and maintain the underlying hardware and/or software.

Such service provider systems may be affected by distributed denial-of-service (DDoS) attacks. A DDoS attack occurs when multiple systems overwhelm the bandwidth or resources of a targeted system, which often is a web server that implements a website or provides data for other applications. Such attacks can be the result of multiple compromised systems (for example, a botnet) flooding the targeted system with traffic. Service provider systems may be victims of DDoS attacks due to hosting resources—such as a website—that is a target of a DDoS attack.

Additionally, service provider systems may inadvertently enable or assist DDoS attacks by providing resources such as virtual machines or bandwidth that are involved in a DDoS attack. For example, a virtual machine that is implemented by a service provider system for a user may be compromised via malware and act as a traffic source for a DDoS attack. Moreover, malicious actors may be able to quickly launch a potentially large number of virtual machines within a service provider system—which may possibly be geographically distributed and have access to a large amount of network bandwidth—and direct those virtual machines to implement, in whole or in part, a DDoS attack against one or more target systems.

BRIEF DESCRIPTION OF DRAWINGS

Various embodiments in accordance with the present disclosure will be described with reference to the drawings, in which.

DETAILED DESCRIPTION

Figure 1:
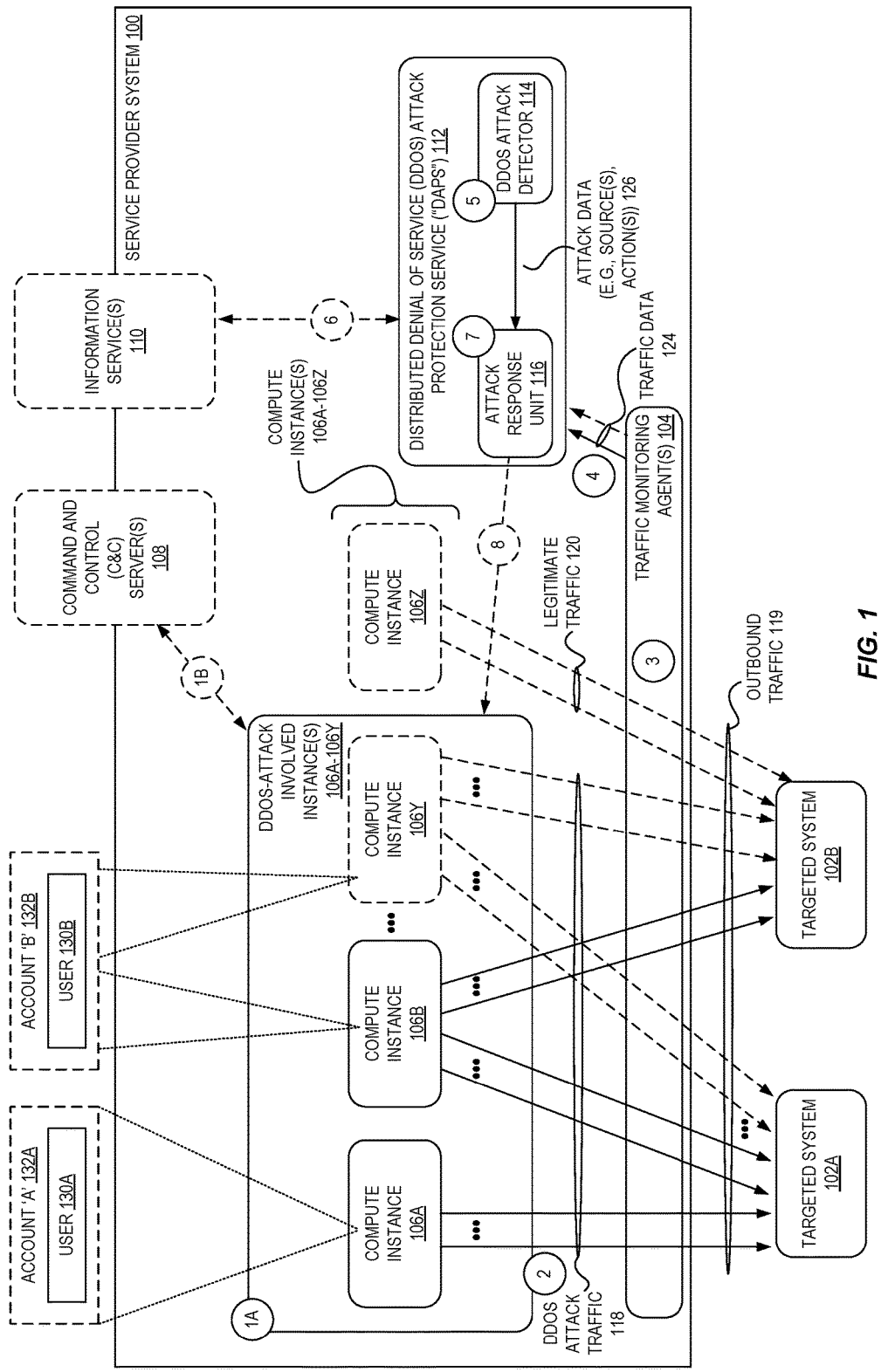
FIG. 1 is a block diagram illustrating a service provider system performing Distributed Denial of Service (DDoS) attack detection and mitigation according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102B, 106A-106Z) may be used to indicate that there can be one or multiple instances of the referenced entity in some embodiments, though these multiple instances do not need to be identical but instead share some general traits or act in common ways. Further, the particular suffixes used are not meant to imply that a particular amount of the entity exists unless specifically indicated to the contrary, and thus two entities using common suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments disclosed herein provide a DDoS attack protection service, or "DAPS", to prevent malicious actors from utilizing service provider systems to perform DDoS attacks against targeted systems. In some embodiments, DDoS attack traffic originated from within a service provider system is quickly identified and this portion of the DDoS attack originated from the service provider system can be mitigated without impacting legitimate traffic of the service provider system, other users of the service provider system, or the security reputation of the legitimate users of the service provider system. A detected DDoS attack can flexibly be responded to (e.g., mitigated) using one or more of multiple candidate responsive actions that can be selected to maximize the mitigation of the DDoS attack while minimizing impact to the users of the service provider system. One or more of a variety of technical benefits can result depending upon the implementation, including but not limited to a significant reduction of network bandwidth utilization within the service provider system and network traffic being passed out of the service provider system, a reduction or elimination of negative impacts (e.g., reduced system bandwidth, processing resource performance and/or availability, etc.) placed upon legitimate uses of the service provider system arising due to the malicious DDoS use, etc.

FIG. 1 is a block diagram illustrating a service provider system 100 performing Distributed Denial of Service (DDoS) attack detection and mitigation according to some embodiments. Modern service provider systems, such as service provider system 100, provide users with the ability to utilize one or more of a variety of types of resources such as computing resources (e.g., executing compute instances such as virtual machine (VM) instances and/or containers, executing batch jobs, executing code without provisioning servers), data/storage resources (e.g., object storage, block-level storage, data archival storage), networking resources (e.g., virtual networks, content delivery networks (CDNs), Domain Name Service (DNS) servers), application resources (e.g., databases, application build/deployment services), etc.

Users of the service provider system 100 may act independently or may be a part of or belong to different entities. An entity may be a formal or informal organization such as a business, non-profit, governmental unit, educational group, shared-interest group, union, collective, etc., and thus the user may act on behalf of (or as part of) the entity. Thus, within the context of the service provider system 100, a user or entity may establish an account (or possibly multiple accounts), where each account is associated with one or more users (or "user accounts"). For example, FIG. 1 illustrates a first compute instance 106A that executes on behalf of a first user 130A associated with a first account 'A' 132A, and that one or more other compute instances 106B-106Y are executed on behalf of a second user 130B associated with a second account 'B' 132B.

As described herein, malicious actors may attempt to use the resources of a service provider system 100 to, in whole or in part, implement a DDoS attack against one or more targeted systems 102A-102B. A targeted system can be a network-accessible hardware and/or software entity such as a web server, application server, load balancer, router, etc.

DDoS attacks are enacted by a variety of different actors, ranging from individual criminal hackers to organized crime rings and government agencies. DDoS attacks are typically implemented using a large number of network-attacked computing systems or devices, often referred to as "bots" that collectively form a "botnet," each of which may be legitimately controlled (e.g., a compute instance 106A in a service provider system 100 executed for a user 130A) or illegitimately controlled (e.g., via a malware infestation or unauthorized access) by an attacker. Thus, an attacker may "control" a botnet, which can include anywhere between hundreds to millions (or more) of bots, via one or more Command and Control (C&C) servers 108 to cause the systems to send DDoS attack traffic 118 to targeted systems 102A-102B to overload them in some manner, rendering them useless for their intended purpose.

C&C servers are typically centralized servers that are able to send commands and receive outputs from systems acting as part of a botnet using one or more standard or non-standard protocols. An attacker seeking to launch a DDoS attack can send special commands to their botnet's C&C server(s) with instructions to perform an attack on one or more particular targeted system(s), and thereafter the C&C server(s) will launch a coordinated attack by communicating commands to the botnet-involved systems to begin directing traffic to the involved targeted system(s). Although in some cases one or more C&C server(s) can be utilized (e.g., in a star or hub-and-spoke topology, in a hierarchical topology, etc.), in some cases C&C server(s) are not utilized, such as when infected bots of a botnet communicate in a distributed or peer-to-peer manner or when other control techniques are utilized.

As one example, at circle '1' a first user 130A may cause the service provider system 100 to execute one or more compute instances 106A for the first user 130A, and the first user 130A may configure or otherwise cause the compute instance(s) 106A to send DDoS attack traffic 118 to targeted system 102A at circle '2'—for example, via purposefully installing malware upon the compute instance 106A and launching an attack via C&C server 108 originated commands sent at circle '1B'.

Additionally, in some cases, a DDoS attack may involve multiple DDoS attack involved instances 106A-106Y that execute on behalf of multiple users 130A-130B. For example, in FIG. 1 a first compute instance 106A executes on behalf of the first user 130A and directs DDoS attack traffic 118 to a first targeted system 102A and a second set of one or more compute instances 106B-106Y executed on behalf of the second user 130B direct DDoS attack traffic 118 to both the first targeted system 102A and a second targeted system 102B.

Additionally or alternatively, one or more DDoS-attack involved instances 106A-106Y may be executed for non-malicious users but may be "infected" (e.g., via installed malware) and thus at least partially controlled by a malicious actor, despite continuing to be used by the legitimate user for legitimate purposes.

In some cases, one or more compute instances (e.g., compute instance 106Z) originate legitimate traffic 120 to one or more of the targeted systems 102A-102B. Although illustrated as not being a part of the DDoS-attack involved instances 106A-106Y, in some embodiments legitimate traffic 120 may also be sent by a compute instance 106A-106Y that is also part of a DDoS attack—i.e., it sends both legitimate traffic 120 as well as DDoS attack traffic 118. As described later herein, embodiments can detect and mitigate DDoS attack traffic 118 without affecting legitimate traffic 120.

The service provider system 100 includes one or more traffic monitoring agents 104 that, at circle '3', obtain or analyze outbound network traffic 119 that includes destination network addresses that are publicly-routable. However, the destination of such traffic may or may not be within the service provider system 100, such as when a public network address is "hosted" within the service provider system 100, and the outbound traffic may or may not actually transit outside the border of the service provider system 100. Thus, although the targeted systems 102A-102B of FIG. 1 are shown as being external to the service provider system 100, in some embodiments one or more of the targeted systems 102A-102B may be internal to the service provider system 100.

The one or more traffic monitoring agents 104 can be implemented in a variety of ways, such as a hardware or software component of an "inline" device (e.g., a network device such as a switch device, a router device, a network card, or a server computing device) within the service provider system 100 that forwards network traffic (including the DDoS attack traffic 118 and/or legitimate traffic 120). As another example, some or all of the traffic monitoring agents 104 can be implemented as a software component implemented by an electronic device that is not inline the path of outbound traffic 119, but instead can monitor the outbound traffic by receiving data from other devices that do forward network traffic. For example, in some embodiments a network device is configured to forward (partial or complete) copies of outbound network traffic to a non-inline traffic monitoring agent 104. In the case that the targeted system(s) 102A-102B are within the service provider system 100, the one or more traffic monitoring agents 104 can detect the traffic—which may or may not transit outside of the service provider system 100—as being "outbound" due to it including (or being directed to) a publicly-routable network address (e.g., a public IP address).

The one or more traffic monitoring agents 104, at circle '4', provide traffic data 124 to the DAPS 112. In some embodiments, this traffic data 124 is sent according to a schedule—e.g., once every five minutes, once every fifteen minutes, once every hour, etc.—and reflects outbound traffic 119 that has been observed since the last traffic data 124 was sent. However, in some embodiments the traffic data 124 can be sent continually or near-continually—e.g., once every second or few seconds, etc. The traffic data 124, in some embodiments, comprises traffic summary data (e.g., NetFlow network flow data such as flow records) that describe the outbound traffic 119 that has been observed by the one or more traffic monitoring agents 104. In some embodiments, the traffic data 124 includes portions of outbound traffic 119 packets (e.g., packet header data without payload data) that have been observed by the one or more traffic monitoring agents 104.

The DAPS 112, as shown in FIG. 1, includes a DDoS attack detector 114 and an attack response unit 116. The DDoS attack detector 114, based on the traffic data 124, detects the existence of a likely DDoS attack originating at least in part from within the service provider system 100 that targets one or more targeted systems (at circle '5'), which may include obtaining information from one or more information services 110 (at optional circle '6'). The DDoS attack detector 114 also identifies the involved sources of the DDoS attack traffic 118 involved with the attack, and selects one or more responsive actions to be performed responsive to detecting the DDoS attack. The identified source(s) and/or responsive action(s) is provided as attack data 126 to the attack response unit 116, which at circle '7' causes the selected one or more responsive actions to be implemented. For example, a selected responsive action identified by the attack data 126 could include blocking one or more compute instances 106A-106Y from being able to transmit network traffic that includes a particular destination port and protocol identifier, and at circle '8' the attack response unit 116 may configure the service provider system 100 (directly, or indirectly via another control plane type entity of the service provider system 100) accordingly.

Figure 2:
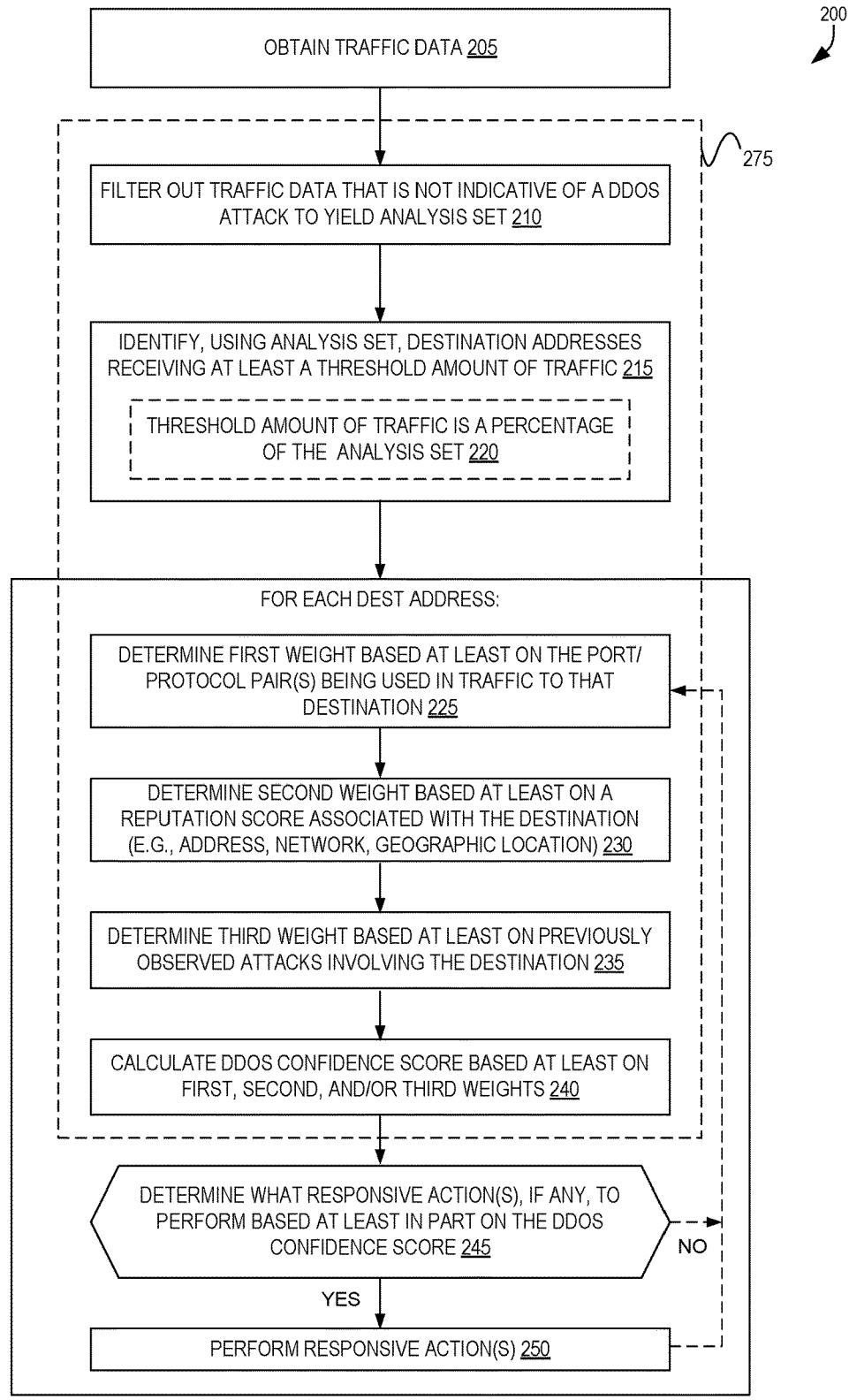
FIG. 2 is a flow diagram illustrating operations for service provider system DDoS attack mitigation according to some embodiments.

For further detail, we turn to FIG. 2, which is a flow diagram illustrating operations 200 for service provider system DDoS attack mitigation according to some embodiments. Some or all of the operations 200 (or any other processes described herein, or variations, and/or combinations thereof—such as operations 300, etc.) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some embodiments, one or more of the operations 200 are performed by the DAPS 112 of FIG. 1.

The operations 200 include, at block 205, obtaining traffic data. Obtaining the traffic data may comprise receiving the traffic data sent from one or more traffic monitoring agents 104 one or more times. The traffic data can include portions of outbound network traffic observed by the one or more traffic monitoring agents 104, or summaries (e.g., NetFlow flow data) of outbound network traffic observed by the one or more traffic monitoring agents 104.

A set of operations 200 is now described with regard to block 275 determining, based at least on the traffic data (obtained at block 205), whether any destination network addresses identified within the traffic data are likely targets of a DDoS attack being at least in part implemented by one or more compute instances (of a plurality of compute instances) within the service provider system.

At block 210, the operations 200 include filtering out traffic data that is extremely unlikely to be indicative of a DDoS attack to yield an analysis set. In some embodiments, that of the traffic data that is "normal" or expected to be observed as part of legitimate traffic can be eliminated from consideration to greatly reduce the size of the dataset and thus the complexity of the analysis. As one example, in some embodiments outbound network traffic represented in the traffic data that has a protocol identifier of Transmission Control Protocol (TCP) and either a destination port of '80' or '443'—commonly used by HyperText Transfer Protocol (HTTP) and HTTP Secure (HTTP) traffic—is removed. As another example, outbound network traffic represented in the traffic data that has a protocol identifier of User Datagram Protocol (UDP) and a destination port of '50' or '4500'—sometimes used for Internet Protocol Security (IPsec) implementations for Virtual Private Networks (VPNs)—is removed. Other identifiers of likely non-malicious traffic can be used to filter the traffic data in various embodiments, such as TCP traffic with a destination port of '22' (e.g., Secure Shell (SSH)), UDP or TCP traffic with a destination port of '3389' (e.g., Remote Desktop Protocol (RDP)), etc. Accordingly, in some embodiments, "normal" traffic data entries (or "records")—e.g., meeting one or more "normal" criteria such as those described above—are removed from the traffic data, to result in the analysis set of traffic data entries.

At block 215, the operations 200 include identifying, using the analysis set (from block 210), any destination network addresses that receive at least a threshold amount of traffic during the period of time associated with the traffic data. Block 215 optionally includes block 220, which indicates that the threshold amount of traffic is a percentage of the analysis set that has a common destination network address. For example, a threshold value can be set—e.g., 10%, 5%, 25%, etc.—to indicate a cutoff point when a network address that appears at least that amount within the analysis set is to be identified as a potential target of a DDoS attack. Given the large size of most service provider systems 100 and the sheer quantity of outbound network traffic over a period of time, it is statistically known that absent any malicious activity—e.g., a DDoS attack—no single destination network address should appear in a very large portion of the outbound network traffic of the analysis set. The threshold value can be set based upon the characteristics of the implementing system to identify scenarios where it is extremely likely that a DDoS attack is occurring, and thus it is extremely unlikely that an identified network address appears in the analysis set as a result of only legitimate use. Thus, the threshold value can be flexibly selected based upon the sensitivity of the particular service provider system 100 to be more aggressive in detecting DDoS attacks (at the risk of a higher false positive rate, but to gain a higher true recall rate) or less aggressive in detecting DDoS attacks (at the risk of some DDoS attacks not being detected, but to gain a higher precision in detecting actual attacks).

For each destination network address identified in block 215, the operations 200 include blocks 225-245 and possibly block 250. Some of these blocks—e.g., block 225-235—involve generating weights, which can be any of a variety of types of data types (e.g., integers, booleans, decimals, etc.) that can be set to distinguish using some amount of granularity (e.g., boolean offers two values, while integers could be used to represent a weight between 0-100) a confidence that a particular destination address is likely to be the target of a DDoS attack.

At block 225, the operations include determining a first weight based at least on the port/protocol pair(s) being used in traffic to that destination network address. The first weight can be assigned according to a scheme that gives more common port/protocol combinations lower weights and less common port/protocol combinations higher weights. This block 225 can assist in increasing the likelihood of the traffic being part of a DDoS attack when the traffic uses either atypical ports or an atypical port for a particular protocol type identified in the traffic. For example, a combination of TCP and port 8080 (a combination that is occasionally used for HTTP traffic) may be assigned a lower weight than TCP and port 244, which is not in current widespread use. This configuration is useful as it has been observed that a significant number of observed DDoS attacks utilize atypical ports; thus, higher weights will be assigned to such occurrences.

At block 230, the operations 200 include determining a second weight based at least on a reputation score associated with the destination (e.g., address, network, geographic location). It has been observed that certain network addresses, network address blocks, networks, geographic locations, etc. are more likely to be a recipient of a DDoS attack than others. As one example, it is quite common that destinations such as news sites and media publications, political organizations, governments, and online gaming networks are the targets of DDoS attacks. Similarly, it has been observed that certain Autonomous System (AS) names (of networks) are more frequently the target of DDoS attacks than others. Accordingly, in some embodiments the determining of the second weight comprises obtaining a reputation score associated with the destination (associated with, or comprising, the destination network address). The obtaining may include performing a lookup in a database or similar data structure within the service provider system 100 to identify a reputation score, or sending a request to an information service 110 (e.g., a web service, website, etc.) that is internal or external to the service provider system 100 for a reputation score.

At block 235, the operations 200 include determining a third weight based at least on previously observed traffic involving the destination network address. For example, in some embodiments block 235 includes performing a lookup in a historical data structure that tracks data about previously-detected DDoS attacks. The historical data structure may track, for example, a "tuple" including a particular destination network address of a targeted system, a particular destination port used in the network traffic sent to the destination network address, and a particular protocol used in the network traffic. However, in some embodiments other metadata may be tracked, and thus this example is to be viewed as illustrative.

One or more tuples can be generated for each destination address in the analysis set to include each unique combination involving the destination address. Thus, if all three values from a tuple match the same three values—destination network address, destination port, and protocol—of a record in the historical data structure, a relatively large weight can be assigned because it is often the case that DDoS attacks will re-use certain, previously-utilized attack techniques (e.g., via scripts, applications), and thus the reappearance of a particular "atypical" combination of port and protocol and destination address is highly suspicious. Likewise, if only two of the three values match a smaller weight may be assigned, and an even smaller value may be assigned if only one of the three values match. In some embodiments, if no record in the historical data structure tracks the same destination network address, or tracks the same port, or tracks the same protocol, a large weight—which may or may not be larger than the weight of a three-value match—can be assigned because such a novel pairing of values is indeed highly atypical absent some malicious intent.

As another example, in addition to (or alternatively to) determining a third weight based at least on previously observed attacks involving the destination network address, block 235 may include determining a weight based on performing a lookup in a historical data structure that tracks some or all network traffic to determine whether a set of values (e.g., the three-tuple described above of destination network address, destination port, protocol) to determine whether the combination has been observed in typical, non-malicious network traffic. When more of the values of the tuple are found in the historical data structure, which indicates that the combination has been previously seen before, the weight can be set low, whereas the weight can be set relatively high when few or none of the values are found in the historical data structure, which thus inherently is anomalous/atypical.

At block 240, the operations 200 include calculating a DDoS confidence score based at least on the first, second, and/or third weights (from blocks 225-235). A variety of techniques can be used for constructing a DDoS confidence score using these weights, such as calculating a sum of the weights, a multiplicative result of the weights, an average of the weights, a weighted average of the weights, etc. As a simple example, in an embodiment using integer weights between 0-100 where a 100 represents the highest likelihood of a destination network address being a target of a DDoS attack, three weights could be determined as '90', '100', and '50' and the DDoS confidence score could be a simple average—i.e., '80'.

At decision block 245, the operations 200 include determining what mitigating responsive actions, if any, are to be performed based at least in part on the DDoS confidence score. In some embodiments, one or more thresholds are configured to differentiate between potential actions. As one example, a threshold value could be set such that DDoS confidence scores above a value result in a more significant mitigation technique (e.g., a significant "lockdown" of the involved sources) or combination of techniques being applied due to the higher likelihood of the traffic being a true DDoS attack, and DDoS confidence scores below the value result in a less significant mitigation technique (e.g., notify an involved user, notify a system administrator of the service provider system, perform a limited port blocking, etc.).

As another example, multiple thresholds could be configured to implement more fine-grained mitigations. For example, a top range could be configured (e.g., integers between 90-100) to place the compute instances involves as sources of the DDoS traffic in isolation (e.g., block all accesses into or out of the compute instance for a period of time or until the block is manually removed, block all traffic flowing out of the compute instance and nearly all traffic flowing to the compute instance (aside from certain traffic—e.g., SSH or RDP accesses—allowing for the "owning" user to clean, pull data from, and/or wipe a compute instance), etc.). Further, a next range could be configured (e.g., integers between 75-89) to implement a port block for the involved compute instances to prohibit those compute instances from sending further outbound traffic over the observed port(s). Additionally, another range could be configured (e.g., integers between 50-74) to notify the user responsible for the compute instances that their compute instances may be compromised with malware or misconfigured. Further, a bottom range could be configured (e.g., integers between 0-49) to result in no mitigation action during this set of operations 200. Of course, if this bottom range matching traffic is actually part of a DDoS attack (e.g., it represents the first set of packets of an attack, but cannot be determined—as of yet—as being definitively part of a DDoS attack), it is likely that a subsequent execution of the set of operations 200 will yield a higher DDoS confidence score and thus result in more substantial mitigation actions.

Figure 3:
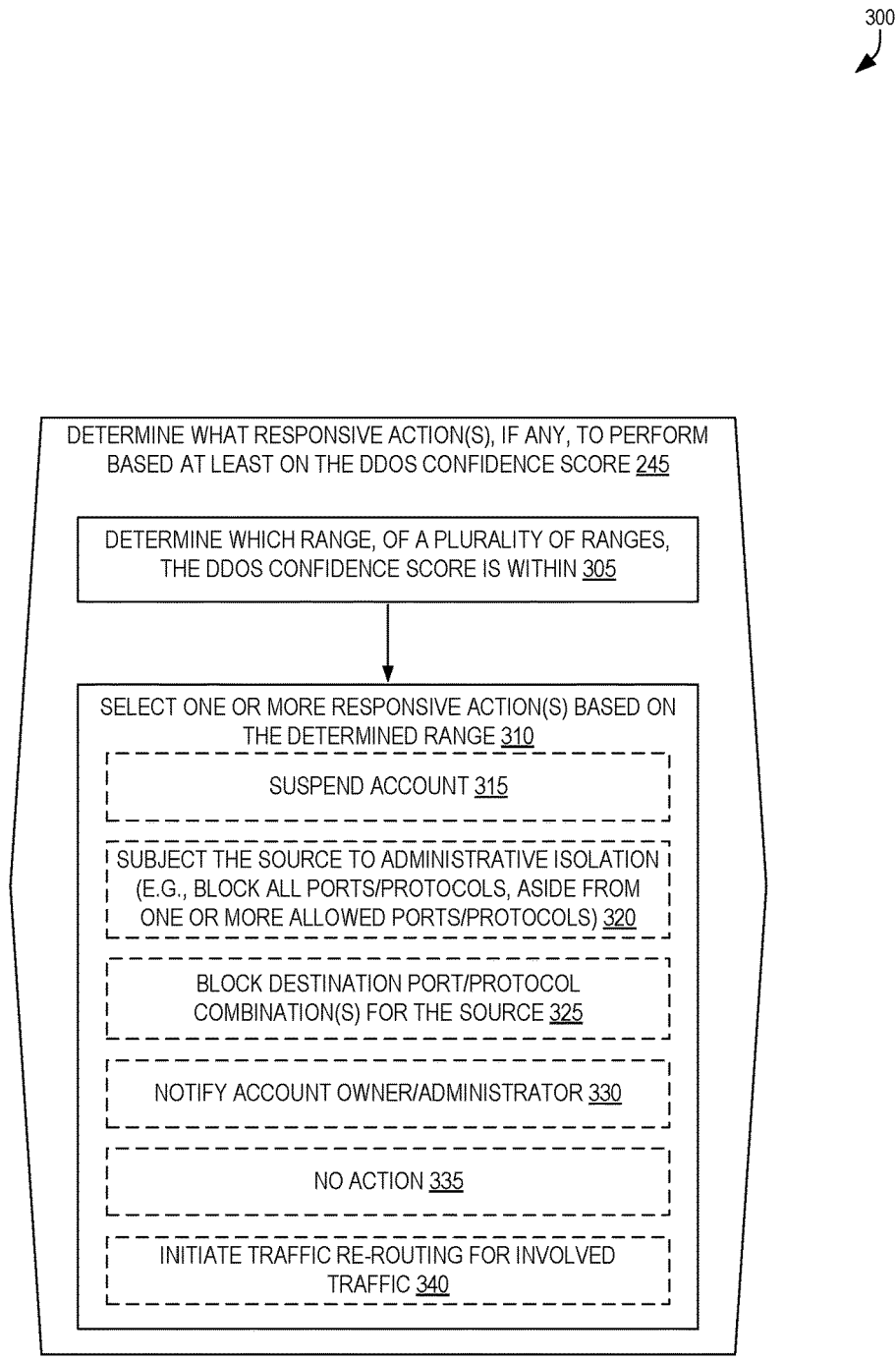
FIG. 3 is a flow diagram illustrating operations for determining responsive actions for DDoS attack mitigation according to some embodiments.

For further detail regarding block 245, we turn to FIG. 3, which is a flow diagram illustrating operations 300 for determining what responsive actions, if any, for DDoS attack mitigation are to be performed according to some embodiments. The depicted operations 300 show one example configuration for performing block 245 of FIG. 2. For example, block 245 includes block 305 and determining which range, of a plurality of ranges, a DDoS confidence score is within. As indicated above, a plurality of ranges (or tiers) can be configured that can be identified (or indexed) via the DDoS confidence score. For example, a single threshold value could be used as a cutoff value to delineate two different ranges, or multiple threshold values could be used to act as multiple cutoff values to delineate multiple ranges. Each range can indicate zero, one, or multiple responsive actions to be performed involving the one or more sources of likely DDoS traffic to a particular destination network address.

At block 310, the operations 300 include selecting one or more responsive actions to be performed based on the determined range. The one or more responsive actions can include, for example, suspending an account of the user that created/operates the involved traffic source compute instances (at optional block 315), subjecting the traffic source to administrative isolation (at optional block 320) by, for example, blocking inbound or outbound traffic associated with the involved traffic source aside from a set of one or more ports and/or protocols (that could be used to access and "fix" or "clean up" an infected compute instance while preventing it from performing other malicious actions), blocking or rate limiting outbound traffic using one or more destination port and protocol pairs for the source (at optional block 325) such as those observed in the analysis set of traffic data, notifying an owner of the account associated with the traffic source of the suspected DDoS attack (or detected suspicious or malicious behavior) associated with the traffic source (at optional block 330), etc.

In some embodiments, a selected responsive action may also be performing no action (at optional block 335) or imitating a traffic re-routing for the involved traffic within the service provider system (at optional block 340). These example actions may be useful when a DDoS confidence score is "low" and thus indicates that the traffic is not likely to be part of a DDoS attack (or is indeterminate of whether it is part of a DDoS attack). For example, upon a compute instance (or instances) sending a relatively large amount of traffic that is analyzed as described herein (e.g., due to using a new port and/or protocol, to a new destination, etc.), this traffic may be non-malicious but still be of relatively large quantity. Accordingly, some embodiments utilizing block 340 can cause the service provider system to proactively analyze the involved traffic and begin (possibly) a re-routing of the traffic (e.g., via a load balancing technique) to lessen the impact of this "new" traffic upon the infrastructure of the service provider system.

Figure 4:
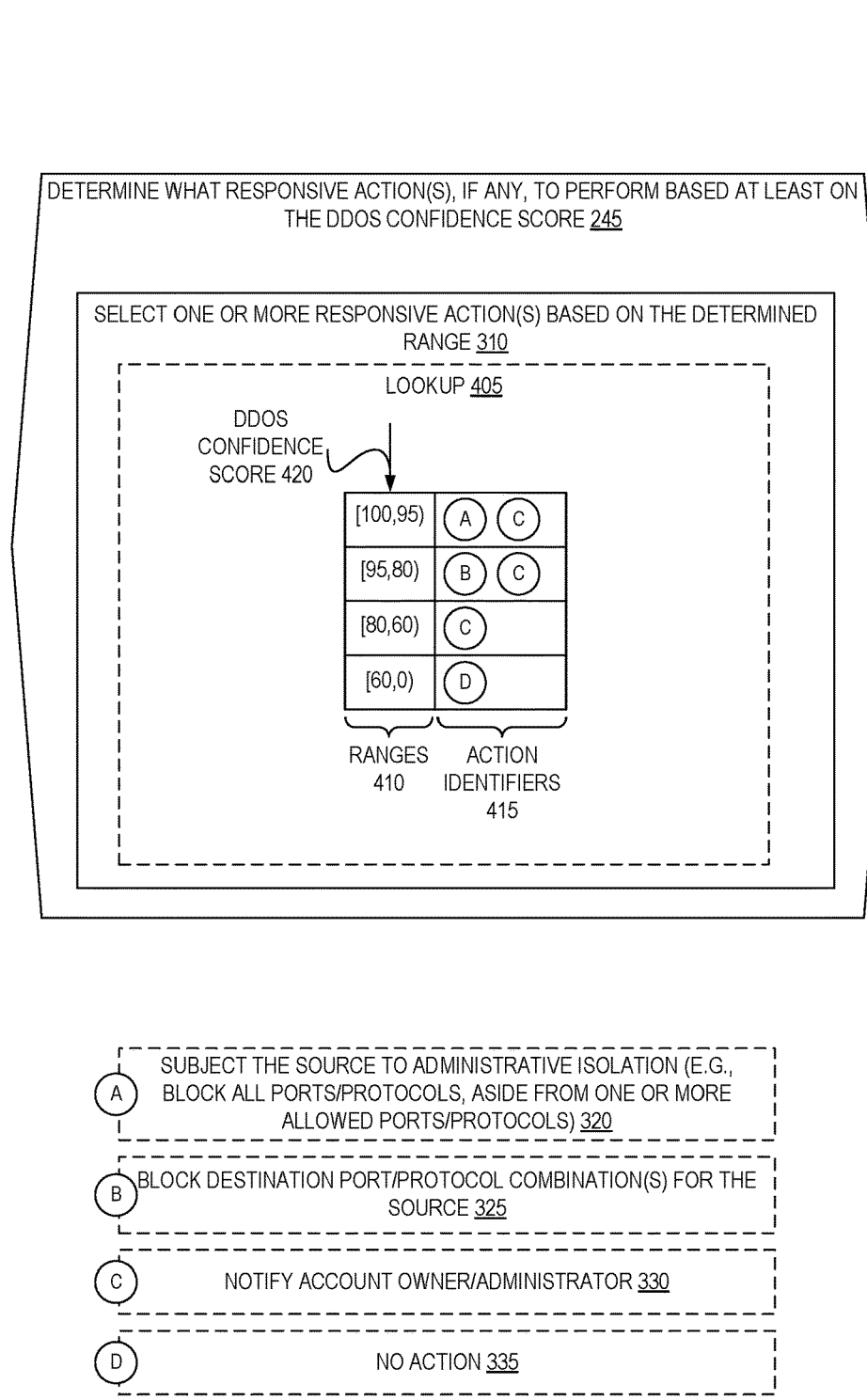
FIG. 4 is a combined flow and block diagram illustrating exemplary operations for selecting DDoS attack responsive actions according to some embodiments.

Further exemplary detail regarding block 310 is presented in FIG. 4, which is a combined flow and block diagram illustrating exemplary operations 400 for selecting DDoS attack responsive actions according to some embodiments. In this example, block 310 (selecting one or more responsive actions based on the determined range) is shown as including a lookup 405 into a data structure using the DDoS confidence score 420. The data structure includes identifiers of four ranges 410, where each corresponds to one or more action identifiers 415 of those actions that are to be performed. For example, for a first range of [100, 95), the action identifiers 415 of "A" and "C" indicate that both the source is to be subjected to administrative isolation (block 320) and further that an account owner or administrator (block 330) is to be notified. Likewise, a second range of [95, 80) has action identifiers 415 of "B" and "C" that indicate that the service provider system is to block outbound traffic using the observed destination port/protocol combination(s) for the source (block 325) and further that an account owner or administrator (block 330) is to be notified. Next, a third range of [80, 60) corresponds to an action identifier 415 of "C" and thus an account owner or administrator (block 330) is to be notified; while the fourth range of [60, 0) corresponds to an action identifier 415 of "D" and thus no action is to be performed.

Figure 5:
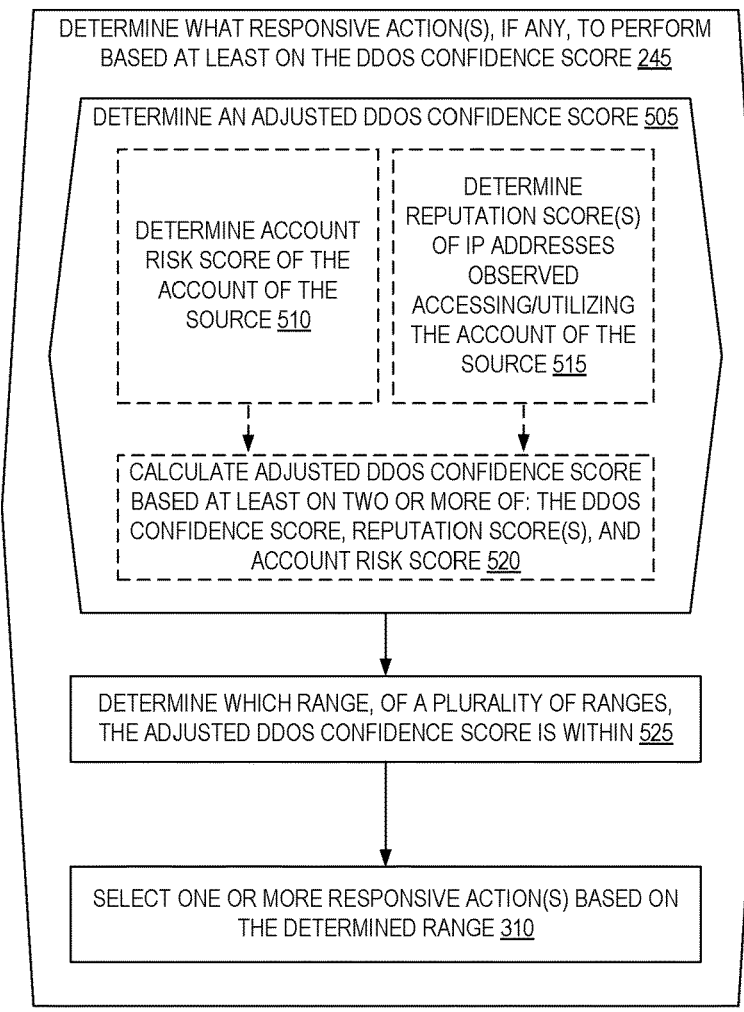
FIG. 5 is a flow diagram illustrating exemplary operations for determining responsive actions for DDoS attack mitigation according to some embodiments.

An alternative formulation for determining what responsive actions to perform (per block 245 of FIG. 2) is provided in FIG. 5, which is a flow diagram illustrating exemplary operations 500 for determining responsive actions for DDoS attack mitigation according to some embodiments. In this example, block 245 includes block 505 and determining an adjusted DDoS confidence score.

Block 505 can include block 510, and determining an account risk score of the account of the source (e.g., compute instance) of the likely DDoS attack traffic. The determining an account risk score can include sending a request for the account risk score (or for account information, which can be used to generate an account risk score) to an information service 110 (e.g., a control entity of the service provider system) associated with the account associated with the source compute instance(s). For example, the information service 110 (or DAPS 112) can obtain account records including a registered person or entity name for the account, a mailing address for the account, financial information (e.g., credit card information such as a ZIP code or billing address, an indicator of whether a prepaid/gift card was used to fund the account, etc.), an age of the account, etc., and perform an analysis to determine whether this information is indicative of potential fraudulent activity. By way of example, a higher account risk score can be assigned if an account is very new (e.g., created in the last day or few days), if a prepaid or other anonymous payment means was used to fund the account, if a personal mailing address component (e.g., state, ZIP, etc.) does not match a corresponding component of the billing address, if a personal mailing address or billing address is not valid, if a personal name does not match a billing name associated with a payment card, if the account is relatively new and has launched a threshold number of compute instances since the account's creation (e.g., instantiated a "maximum" number of compute instances based upon an account type of the account), if an amount of resource/service usage (e.g., compute hours, bandwidth) under the account within the service provider system exceeds a threshold or is substantially larger than previous amounts, etc.

Additionally or alternatively, block 505 can include block 515 and determining one or more reputation score(s) of network addresses (e.g., Internet Protocol (IP) addresses) observed accessing/utilizing account resources of the account corresponding to the source(s) of the DDoS attack network traffic. It has been observed that when some DDoS attacks are launched (or other malicious behavior is performed) using resources of a service provider system, clients may interact with the service provider system using public IP addresses from certain address ranges, networks, countries, etc., that are known as being of a higher likelihood of being involved with malicious activity. For example, an account owned by an enterprise located in the United States may suddenly be accessed from a source IP address located in a faraway country or in a strange network that is known to be associated with other malicious behavior. As another example, an account may suddenly be accessed by a user via traffic appearing to originate from a known VPN exit node or Tor exit node, thus indicating that the user is attempting to hide the true location of the user. According, a network address that is known as being associated with such locations, which are often associated with malicious activity, can be detected as likely being suspicious. Accordingly, block 515 can include sending a request for one or more reputation scores to an information service 110 (e.g., a control entity of the service provider system) that can identify the observed network addresses and itself issue requests for reputation scores (e.g., to another internal or external information service 110) corresponding to those network addresses, which may ultimately be provided in a response message. Block 515 can alternatively include sending a request for the observed network addresses to an internal information service 110 (which can be returned in a first response), identifying the observed network address(es) from the first response, and issuing a second request (e.g., to another internal or external information service 110) for reputation scores corresponding to those network addresses, which may ultimately be provided in a second response message.

With the account risk score (from block 510) and/or the reputation score(s) (from block 515), block 505 can further include block 520 and calculating an adjusted DDoS confidence score based at least on two or more of: the DDoS confidence score (of block 240), the reputation score(s), and account risk score. For example, this calculating of the adjusted DDoS confidence score can an addition of these three values, a multiplication of these three values, etc. Alternatively, although not illustrated, the calculation of the DDoS confidence score (of block 240) itself can be modified to further be based on the reputation score(s) and/or account risk score, and thus block(s) 510 and/or 515 may be performed prior to block 240.

Although one or more of these scores (of blocks 510 and 515) are shown as being used to generate an adjusted DDoS confidence score (at block 520), other types of scores may be used in addition to or alternatively to these scores, and thus these example scores are to be viewed as illustrative. For example, in some embodiments a score is generated based on identifying whether the source has communicated (e.g., over a recent period of time) with a known C&C server 108, where a higher score can indicate that the source has in fact communicated with a known C&C server. As another example, in some embodiments a score is generated based on determining whether a number of sources began transmitting traffic to a "new" destination (that these sources had not communicated with previously) at approximately the same time.

With the adjusted DDoS confidence score (or the DDoS confidence score as indicated above), block 245 includes determining which range, of a plurality of ranges, the adjusted DDoS confidence score is within. Block 525 can be performed similar to block 305 of FIG. 3. After block 525, block 610 can be performed to select one or more responsive actions based on the determined range.

Turning back to FIG. 2, when block 245 determines that one or more responsive actions are to be performed, the operations 200 continue to block 250 and performing the responsive actions. Block 250 can include control entities of the service provider system 100 to, e.g., block certain sources (e.g., compute instances involved with the sending of the DDoS traffic) from transmitting and/or receiving network traffic using certain ports or protocols, send notifications or users or system administrators, etc.

Figure 6:
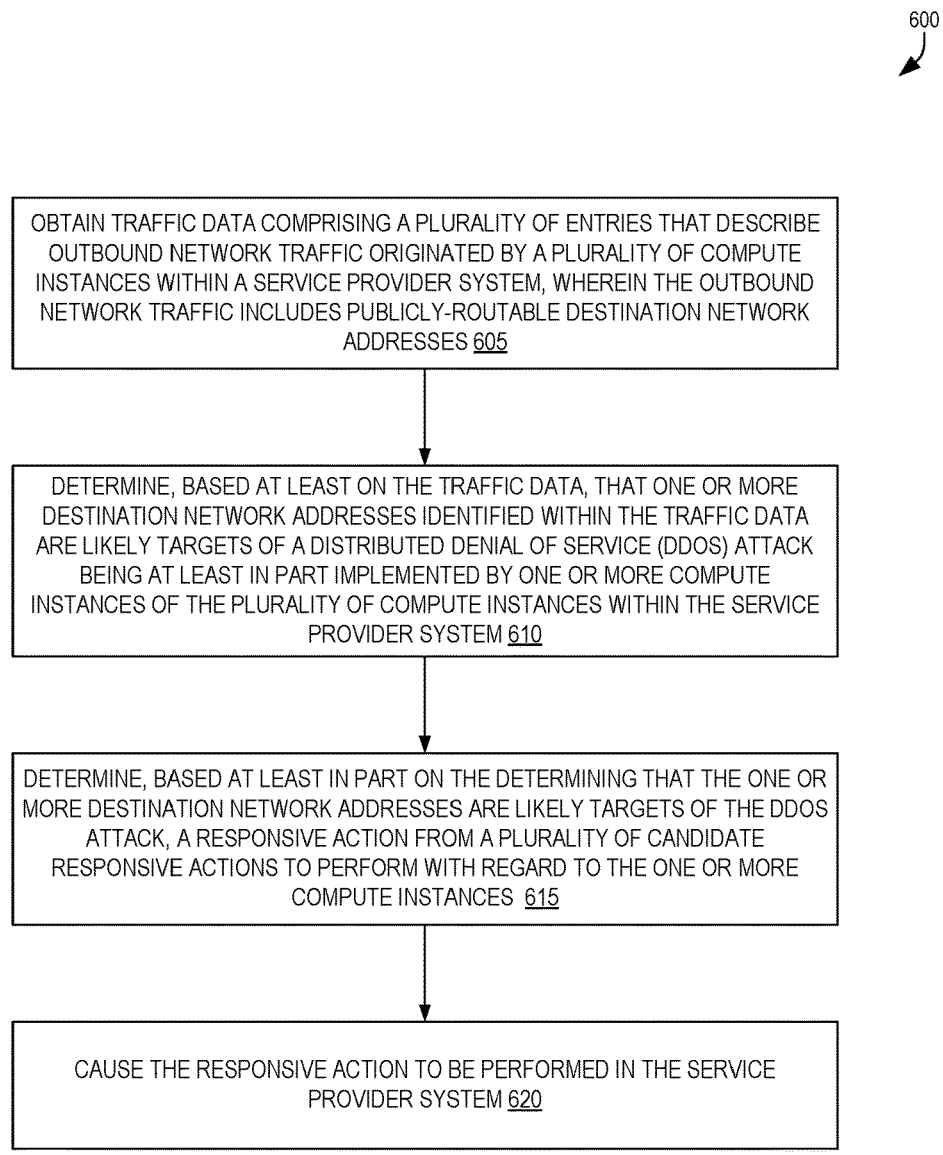
FIG. 6 is a flow diagram illustrating exemplary operations for service provider system DDoS attack mitigation according to some embodiments.

We now turn to FIG. 6, which is a flow diagram illustrating exemplary operations 600 for service provider system DDoS attack mitigation according to some embodiments.

The operations 600 include, at block 605, obtaining traffic data comprising a plurality of entries that describe outbound network traffic originated by a plurality of compute instances within a service provider system. The traffic data includes publicly-routable network addresses, and may or may not be destined to locations outside the service provider system. The traffic data may comprise portions (e.g., packet headers) of the outbound network traffic or may comprise summarization data such as NetFlow data that describes flows of packets in aggregate. The compute instances can be virtual machines, containers, etc.

The operations 600 include, at block 610, determining, based at least on the traffic data, that one or more destination network addresses identified within the traffic data are likely targets of a DDoS attack being at least in part implemented by one or more compute instances of the plurality of compute instances within the service provider system. The DDoS attack may be entirely launched by compute instances within the service provider system, or may include both compute instances within the service provider system and also other systems outside the service provider system.

In some embodiments, the determining that the one or more destination network addresses identified within the traffic data are likely targets of the DDoS attack comprises removing, from the plurality of entries, one or more entries that have a port value and a protocol value that when appearing together in network traffic are not indicative of DDoS attack traffic to result in an analysis set of entries (or the "filtered set"). In some embodiments, the determining that the one or more destination network addresses identified within the traffic data are likely targets of the DDoS attack further comprises identifying, from the analysis set of entries, whether any destination network addresses appear a threshold amount in the analysis set of entries, wherein the identifying leads to (or "results in") the one or more destination network addresses being identified. The threshold amount may be a percentage (e.g., a percentage of the analysis set) or a number of entries (e.g., that must exist within the analysis set).

The operations 600 include, at block 615, determining a responsive action from a plurality of candidate responsive actions to perform with regard to the one or more compute instances.

In some embodiments, the plurality of candidate responsive actions includes blocking the one or more compute instances from sending future network traffic over one or more ports to destinations outside the service provider system, and in some embodiments the plurality of candidate responsive actions include one or more of suspending an account within the service provider system that is associated with one or more sources of the DDoS attack traffic, blocking certain network traffic of the one or more involved sources (e.g., all traffic, nearly all traffic aside from traffic allowing administrative access to the source, traffic using a particular port and/or protocol combination, etc.), notifying an account owner associated with an account associated with the source(s) of the DDoS attack traffic, notifying a network administrator, taking no action, initiating a traffic re-routing for similar traffic within the service provider system network(s), etc.

In some embodiments, the determining that the one or more destination network addresses identified within the traffic data are likely targets of the DDoS attack further comprises generating one or more weights for each of the destination network addresses, and the determining the responsive action comprises selecting the responsive action based at least on the one or more weights. In some embodiments, generating the one or more weights comprises generating, for each of the one or more destination network addresses, a first weight based at least on a port value and a protocol value identified in at least one of the entries destined to the destination network address. In some embodiments, generating the one or more weights comprises obtaining, for each of the one or more destination network addresses, a second weight indicating a reputation score for the destination network address indicating an amount of malicious or suspicious activity that has been previously associated with the destination network address.

In some embodiments, the generating the one or more weights comprises identifying a tuple comprising a plurality of values. The plurality of values includes the destination network address, a port value used in those of the analysis set of entries destined to the destination network address, and a protocol value used in those of the analysis set of entries destined to the destination network address. In some embodiments, the generating the one or more weights further comprises generating a third weight based at least on identifying how many of plurality of values have been previously observed together in previous network traffic within the service provider system.

In some embodiments, determining the responsive action includes determining a risk score for an account within the service provider system. The first compute instance is executed on behalf of the account. The risk score represents a likelihood that the account is fraudulent, and determining the risk score includes at least one of determining whether one or more registration data values provided during a creation of the account is legitimate or determining an age of the account. In some embodiments, determining the responsive action further includes selecting the responsive action based at least in part on the risk score.

In some embodiments, determining the responsive action includes determining one or more network address reputation scores of one or more network addresses that appeared as a source of network traffic received during a previous window of time that sought to perform actions on behalf of the account, and selecting the responsive action based at least in part on the one or more network address reputation scores.

The operations 600 include, at block 620, causing the responsive action to be performed in the service provider system.

Figure 7:
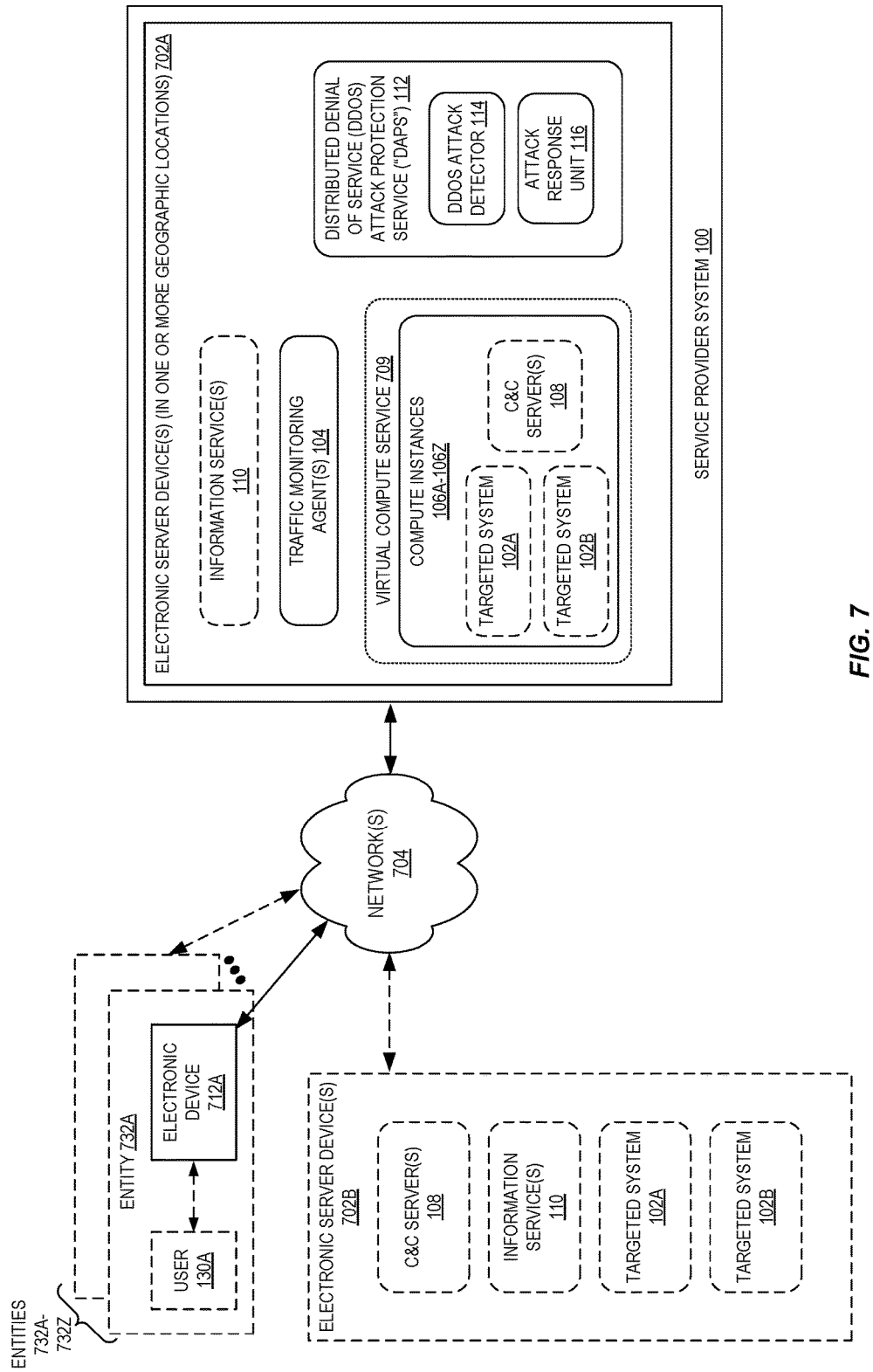
FIG. 7 is a block diagram illustrating example deployment implementations of components of an environment implementing service provider system DDoS attack mitigation according to some embodiments.

FIG. 7 is a block diagram illustrating example deployment implementations of components of an environment implementing service provider system DDoS attack mitigation according to some embodiments. As indicated herein, a user 130A may be part of an entity 732A (e.g., an organization) and may operate an electronic device 714 of the entity 732A and/or within a network of the entity 732A. The electronic device 712A may be used to communicate with the service provider system 100 described herein, e.g., to register an account, launch and/or configure compute instances, etc. The electronic device 714 may be an electronic client device described in additional detail later herein.

The environment may further include electronic server devices 702B that implement targeted systems 102A-102B and optionally one or more information services 110 and C&C servers 108. The one or more electronic server devices 702B may be within a network of an entity 732A, or located in different locations and/or operate in different networks.

Devices of the entity 732A and the electronic servicer devices 702B may connect via one or more public networks 704 (e.g., the Internet) to the service provider system 100. The service provider system 100 can include one or more electronic server devices 702A, which may be located in multiple geographic locations. The one or more electronic server devices 702A implement one or more hardware and/or software entities, including but not limited to one or more information services 110, one or more traffic monitoring agents 104, DAPS 112, etc.

The one or more electronic server devices 702A also implement a virtual compute service 709 providing one or more compute instances 106A-106Z (e.g., VMs, containers), one or more of which may (inadvertently) implement one or more C&C servers 108 on behalf of some malicious user(s).

Figure 8:
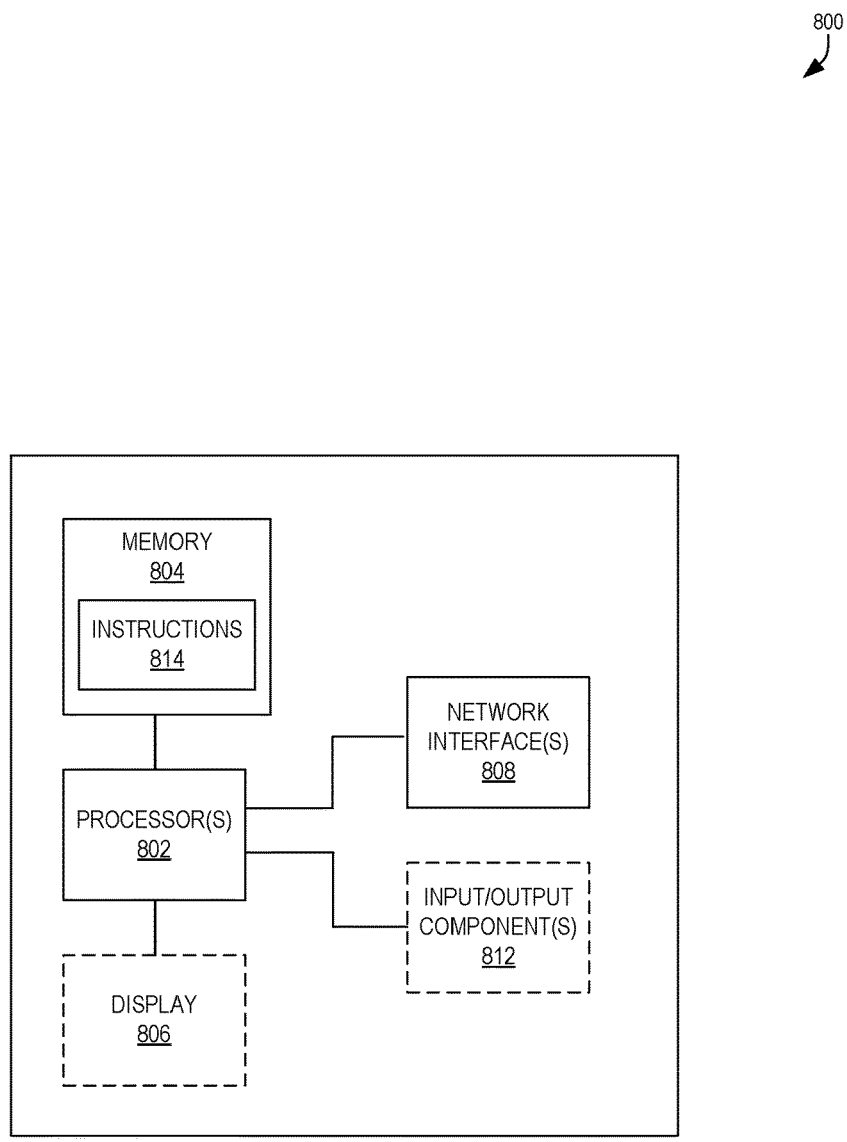
FIG. 8 illustrates a logical arrangement of a set of general components of an exemplary computing device that can be utilized in accordance with various embodiments.

FIG. 8 illustrates a logical arrangement of a set of general components of an example computing device 800 such as electronic device 712A, electronic server device(s) 702B, electronic server device(s) 702A, etc. Generally, a computing device 800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 804) to store code (e.g., instructions 814) and/or data, and a set of one or more wired or wireless network interfaces 808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 804) of a given electronic device typically stores code (e.g., instructions 814) for execution on the set of one or more processors 802 of that electronic device. One or more parts of various embodiments may be implemented using different combinations of software, firmware, and/or hardware.

A computing device 800 can include some type of display element 806, such as a touch screen or liquid crystal display (LCD), although many devices such as portable media players might convey information via other means, such as through audio speakers, and other types of devices such as server end stations may not have a display element 806 at all. As discussed, some computing devices used in some embodiments can include at least one input and/or output component(s) 812 able to receive input from a user. This input component can include, for example, a push button, touch pad, touch screen, wheel, joystick, keyboard, mouse, keypad, or any other such device or element whereby a user can input a command to the device. In some embodiments, however, such a device might be controlled through a combination of visual and/or audio commands and utilize a microphone, camera, sensor, etc., such that a user can control the device without having to be in physical contact with the device.

Figure 9:
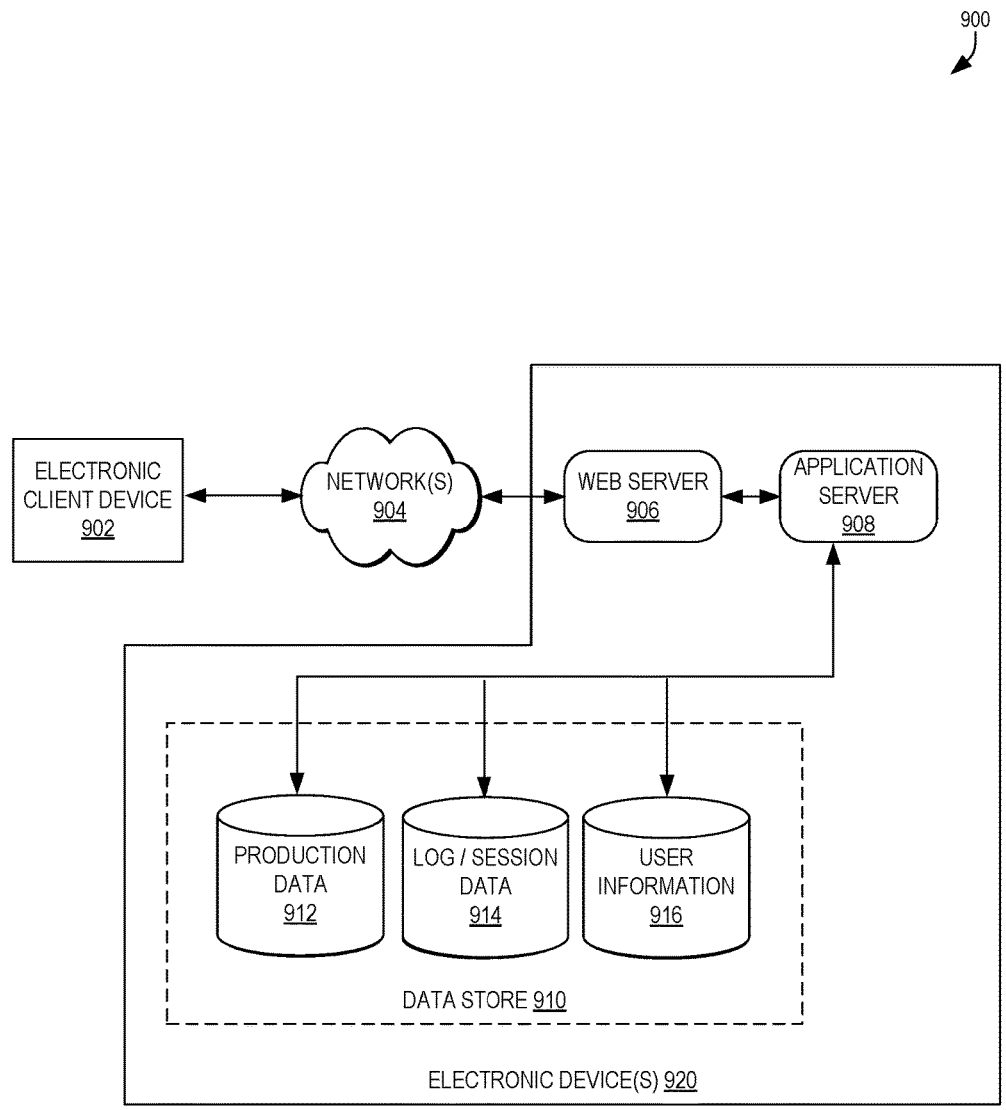
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. For example, in some embodiments electronic client devices 902 may send HTTP requests that are received by a web server (e.g., web server 906), and the users 130A-130B via electronic devices 912A-912B may interact with the service provider system 100 (e.g., to define and manage policies and/or resources) via a web portal provided via the web server 906 and application server 908. As will be appreciated, although a web-based environment is used for purposes of explanation, different environments may be used, as appropriate, to implement various embodiments. The system includes an electronic client device 902 (e.g., electronic device 912A), which may also be referred to as a client end station and can be any appropriate device operable to send and receive requests, messages or information over an appropriate network 704 (e.g., network(s) 704) and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected.

Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations, and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining traffic data comprising a plurality of entries that describe outbound network traffic originated by a plurality of compute instances within a service provider system, wherein the outbound network traffic includes publicly-routable destination network addresses;
determining, based at least on the traffic data, that one or more destination network addresses identified within the traffic data are likely targets of a distributed denial of service (DDoS) attack being at least in part implemented by one or more compute instances of the plurality of compute instances within the service provider system;
determining, based at least in part on the determining that the one or more destination network addresses are likely targets of the DDoS attack, a responsive action from a plurality of candidate responsive actions to perform with regard to the one or more compute instances, the determining of the responsive action comprising:
determining a risk score for an account within the service provider system, wherein the one or more compute instances are executed on behalf of the account, wherein the risk score represents a likelihood that the account is fraudulent, and wherein determining the risk score includes at least one of:
determining an amount of resource usage within the service provider system under the account,
determining whether one or more registration data values provided during a creation of the account are legitimate, or
determining an age of the account and
selecting the responsive action based at least in part on the risk score; and
causing the responsive action to be performed in the service provider system.

2. The computer-implemented method of claim 1, wherein the determining that the one or more destination network addresses identified within the traffic data are likely targets of the DDoS attack comprises:
removing, from the plurality of entries, one or more entries that have a port value and a protocol value that when appearing together in network traffic are not indicative of DDoS attack traffic to result in an analysis set of entries.

3. The computer-implemented method of claim 2, wherein the determining that the one or more destination network addresses identified within the traffic data are likely targets of the DDoS attack further comprises:
identifying, from the analysis set of entries, whether any destination network addresses appear a threshold amount within the analysis set of entries, wherein the identifying results in the one or more destination network addresses being identified, and wherein the threshold amount identifies a percentage or a number of entries.

4. The computer-implemented method of claim 1, wherein:
the determining that the one or more destination network addresses identified within the traffic data are likely targets of the DDoS attack further comprises generating one or more weights for each of the destination network addresses; and
the determining the responsive action comprises selecting the responsive action based at least in part on the one or more weights.

5. The computer-implemented method of claim 4, wherein generating the one or more weights comprises:
generating, for each of the one or more destination network addresses, a first weight based at least on a port value and a protocol value identified in at least one of the entries destined to the destination network address.

6. The computer-implemented method of claim 5, wherein generating the one or more weights comprises:
determining, for each of the one or more destination network addresses, a second weight based at least in part on a reputation score for the destination network address that indicates an amount of malicious or suspicious activity that has been previously associated with the destination network address.

7. The computer-implemented method of claim 6, wherein generating the one or more weights comprises:
identifying a tuple comprising a plurality of values, the plurality of values including the destination network address, a port value used in those of the analysis set of entries destined to the destination network address, and a protocol value used in those of the analysis set of entries destined to the destination network address; and
generating a third weight based at least on identifying how many of the plurality of values of the tuple have been previously observed together in previous network traffic within the service provider system.

8. The computer-implemented method of claim 1, wherein the plurality of candidate responsive actions includes blocking the one or more compute instances from sending future network traffic over one or more ports to destinations outside the service provider system.

9. The computer-implemented method of claim 1, wherein determining the responsive action includes:
determining one or more network address reputation scores of one or more network addresses that appeared as a source of network traffic received during a previous window of time that sought to perform actions on behalf of the account; and
selecting the responsive action based at least in part on the one or more network address reputation scores.

10. A system comprising:
a first one or more electronic devices of a service provider system that implement one or more traffic monitoring agents, the one or more traffic monitoring agents to monitor outbound network traffic originated by a plurality of compute instances within the service provider system that includes publicly-routable destination network addresses; and
a second one or more electronic devices that implement a distributed denial of service (DDoS) attack protection service, the DDoS attack protection service including instructions that when executed by one or more processors of the second one or more electronic devices cause the DDoS attack protection service to:
obtain traffic data, from the one or more traffic monitoring agents, comprising a plurality of entries that describe the outbound network traffic;

determine, based at least on the traffic data, that one or more destination network addresses identified within the traffic data are likely targets of a DDoS attack being at least in part implemented by one or more compute instances of the plurality of compute instances within the service provider system;

determine a responsive action from a plurality of candidate responsive actions to perform with regard to the one or more compute instances, the determination of the responsive action comprising:
  a determination of one or more network address reputation scores of one or more network addresses that appeared as a source of network traffic received during a previous window of time that sought to perform actions on behalf of an account associated with the one or more compute instances; and
  a selection of the responsive action based at least in part on the one or more network address reputation scores; and cause the responsive action to be performed in the service provider system.

11. The system of claim 10, wherein the DDoS attack protection service, to determine that the one or more destination network addresses identified within the traffic data are likely targets of the DDoS attack, is to:
remove, from the plurality of entries, one or more entries that have a port value and a protocol value that when appearing together in network traffic are not indicative of DDoS attack traffic to result in an analysis set of entries.

12. The system of claim 11, wherein the DDoS attack protection service, to determine that the one or more destination network addresses identified within the traffic data are likely targets of the DDoS attack, is further to:
identify, from the analysis set of entries, whether any destination network addresses appear a threshold amount within the analysis set of entries, wherein the threshold amount identifies a percentage or a number of entries.

13. The system of claim 12, wherein:
the DDoS attack protection service, to determine that the one or more destination network addresses identified within the traffic data are likely targets of the DDoS attack, is further to generate one or more weights for each of one or more destination network addresses identified as appearing the threshold amount; and
the DDoS attack protection service, to determine the responsive action, is to select the responsive action based at least on the one or more weights.

14. The system of claim 13, wherein the DDoS attack protection service, to generate the one or more weights, is to:
generate, for each of the one or more destination network addresses identified as appearing the threshold amount, a first weight based at least on a port value and a protocol value identified in at least one of the entries destined to the destination network address.

15. The system of claim 14, wherein the DDoS attack protection service, to generate the one or more weights, is further to:
determine, for each of the one or more destination network addresses, a second weight based at least in part on a reputation score for the destination network address that indicates an amount of malicious or suspicious activity that has been previously associated with the destination network address.

16. The system of claim 15, wherein the DDoS attack protection service, to generate the one or more weights, is further to:
identify a tuple comprising a plurality of values, the plurality of values including the destination network address, a port value used in those of the analysis set of entries destined to the destination network address, and a protocol value used in those of the analysis set of entries destined to the destination network address; and
generate a third weight based at least on an identification of how many of the plurality of values of the tuple have been previously observed together in previous network traffic within the service provider system.

17. A computer-implemented method comprising:
obtaining traffic data comprising a plurality of entries that describe outbound network traffic originated by a plurality of compute instances within a service provider system, wherein the outbound network traffic includes publicly-routable destination network addresses;
determining, based at least on the traffic data, that one or more destination network addresses identified within the traffic data are likely targets of a distributed denial of service (DDoS) attack being at least in part implemented by one or more compute instances of the plurality of compute instances within the service provider system;
determining, based at least in part on the determining that the one or more destination network addresses are likely targets of the DDoS attack, a responsive action from a plurality of candidate responsive actions to perform with regard to the one or more compute instances, wherein determining the responsive action comprises:
  determining one or more network address reputation scores of one or more network addresses that appeared as a source of network traffic received during a previous window of time that sought to perform actions on behalf of an account associated with the one or more compute instances, and
  selecting the responsive action based at least in part on the one or more network address reputation scores; and
causing the responsive action to be performed in the service provider system.

18. The computer-implemented method of claim 17, wherein the determining that the one or more destination network addresses identified within the traffic data are likely targets of the DDoS attack comprises:
removing, from the plurality of entries, one or more entries that have a port value and a protocol value that when appearing together in network traffic are not indicative of DDoS attack traffic to result in an analysis set of entries.

19. The computer-implemented method of claim 18, wherein the determining that the one or more destination network addresses identified within the traffic data are likely targets of the DDoS attack further comprises:
identifying, from the analysis set of entries, whether any destination network addresses appear a threshold amount within the analysis set of entries, wherein the identifying results in the one or more destination network addresses being identified, and wherein the threshold amount identifies a percentage or a number of entries.

20. The computer-implemented method of claim 17, wherein:

the determining that the one or more destination network addresses identified within the traffic data are likely targets of the DDoS attack further comprises generating one or more weights for each of the destination network addresses; and the determining the responsive action comprises selecting the responsive action based at least in part on the one or more weights.

\* \* \* \* \*